Figure 1:
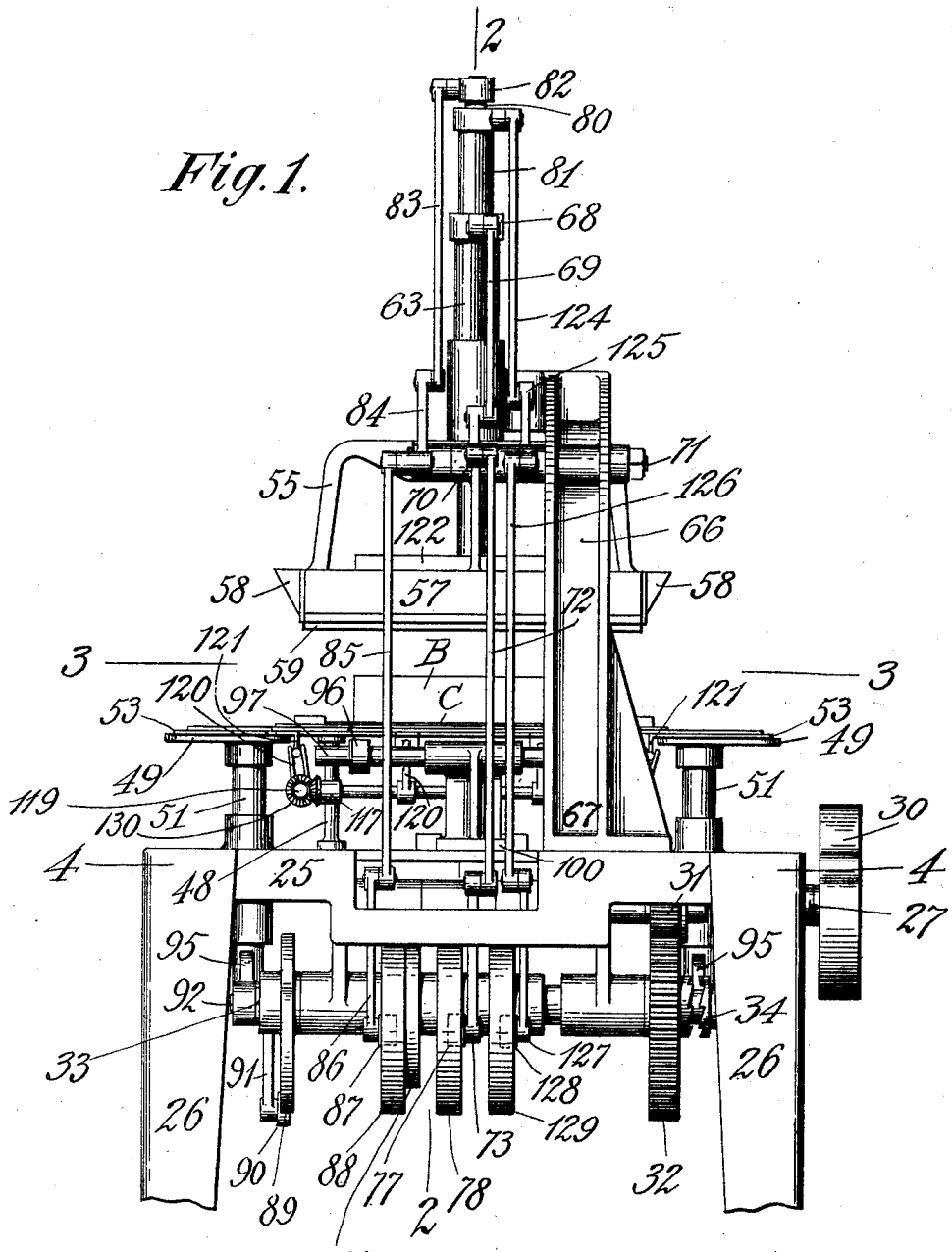

No. 756,812. PATENTED APR. 12, 1904.
J. BARDELLI.
MACHINE FOR COVERING PAPER BOXES.
APPLICATION FILED APR. 13, 1903.
NO MODEL. 6 SHEETS—SHEET 1.

Witnesses:
A. V. Leahy
Chas. P. Shuel

Inventor:
Joseph Bardelli,
By his Attorney,
Wm. F. Bellows.

No. 756,812. PATENTED APR. 12, 1904.
J. BARDELLI.
MACHINE FOR COVERING PAPER BOXES.
APPLICATION FILED APR. 13, 1903.
NO MODEL. 6 SHEETS—SHEET 3.

Witnesses:
Inventor: Joseph Bardelli,
By his Attorney,

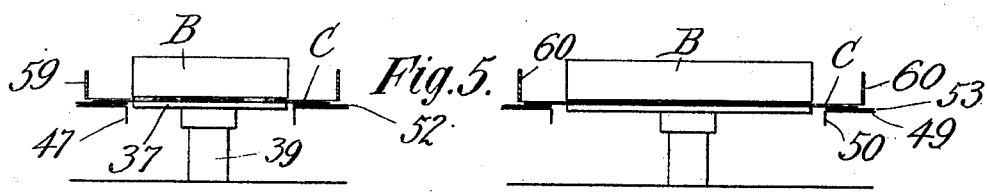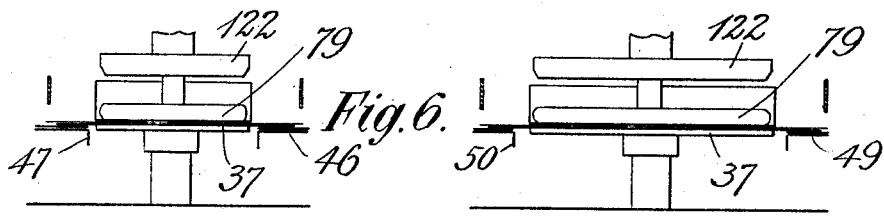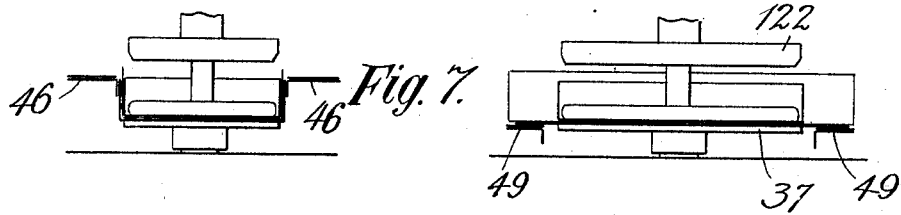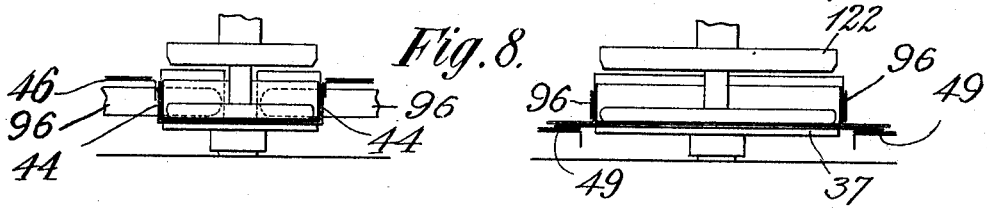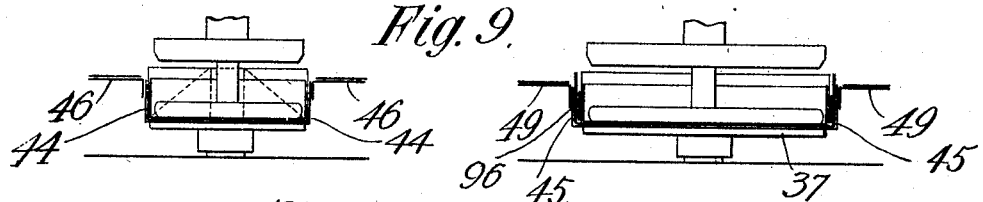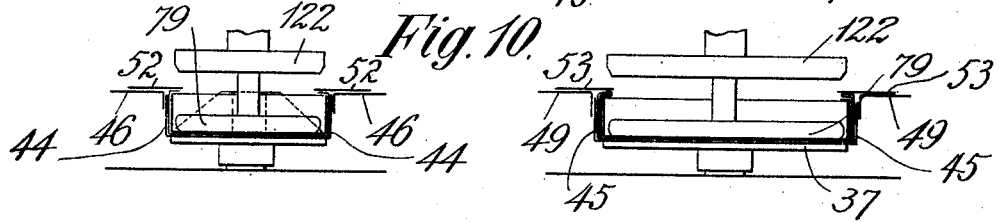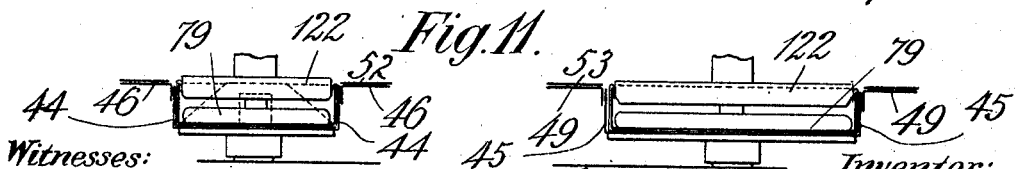

No. 756,812. PATENTED APR. 12, 1904.
J. BARDELLI.
MACHINE FOR COVERING PAPER BOXES.
APPLICATION FILED APR. 13, 1903.
NO MODEL. 6 SHEETS—SHEET 5.

Witnesses:
A. V. Leahy.
Chas. T. Schmelz

Inventor:
Joseph Bardelli,
By his Attorney,
Wm. F. Bellows.

THE NORRIS PETERS CO., PHOTO-LITHO., WASHINGTON, D. C.

No. 756,812. PATENTED APR. 12, 1904.
J. BARDELLI.
MACHINE FOR COVERING PAPER BOXES.
APPLICATION FILED APR. 13, 1903.
NO MODEL. 6 SHEETS—SHEET 6.
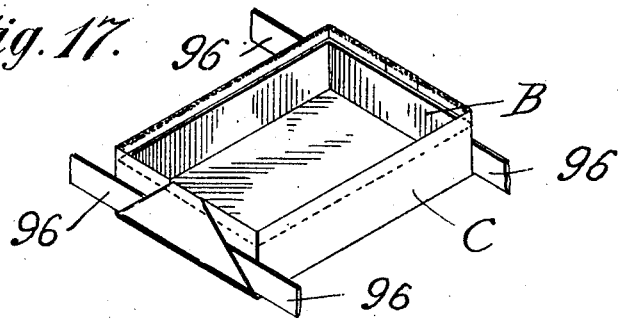
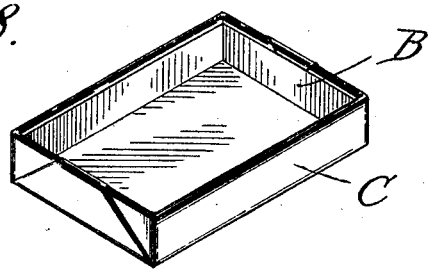

No. 756,812. Patented April 12, 1904.

UNITED STATES PATENT OFFICE.

JOSEPH BARDELLI, OF SPRINGFIELD, MASSACHUSETTS.

MACHINE FOR COVERING PAPER BOXES.

SPECIFICATION forming part of Letters Patent No. 756,812, dated April 12, 1904.

Application filed April 13, 1903. Serial No. 152,459. (No model.)

*To all whom it may concern:*

Be it known that I, JOSEPH BARDELLI, a citizen of the United States of America, and a resident of Springfield, in the county of Hampden and State of Massachusetts, have invented certain new and useful Improvements in Machines for Covering Paper Boxes, of which the following is a full, clear, and exact description.

This invention relates to improvements in machines for covering with a glazed or other finish covering-paper paper or cardboard boxes, the object being to provide a machine in which it is only necessary to place the sheet of covering-paper in its suitable position on the paper-support therefor in the machine and to place the box to be covered approximately centrally of the sheet, the different instrumentalities in the machine, gumming along marginal portions of the blank, folding up the opposite sides of the covering-sheet against the sides of the box, tucking in the end extremities of the blank, which in such operation become folded on diagonal lines, turning up the ends of the blank against the ends of the box, inturning the edge portions of the blank which project beyond the upper edges of the box, so that they are deflected within the vertical box sides, and again folding such marginal portions of the blank against the inner walls of the box, concurrently with which the sticking and binding of such edge portions are accomplished, and the parts of the machine which intimately operate on the blank for wrapping and binding it about the box, thereafter retiring, permit the completed covered box to be removed from the machine and another blank and box to be set in place to be also covered.

The invention consists in the combination and arrangements of parts and instrumentalities and in the construction of certain of the parts, all substantially as hereinafter described, and set forth in the claims.

Reference is to be had to the accompanying drawings, in which a machine constructed in accordance with this invention is exemplified, and in which—

Figure 2:
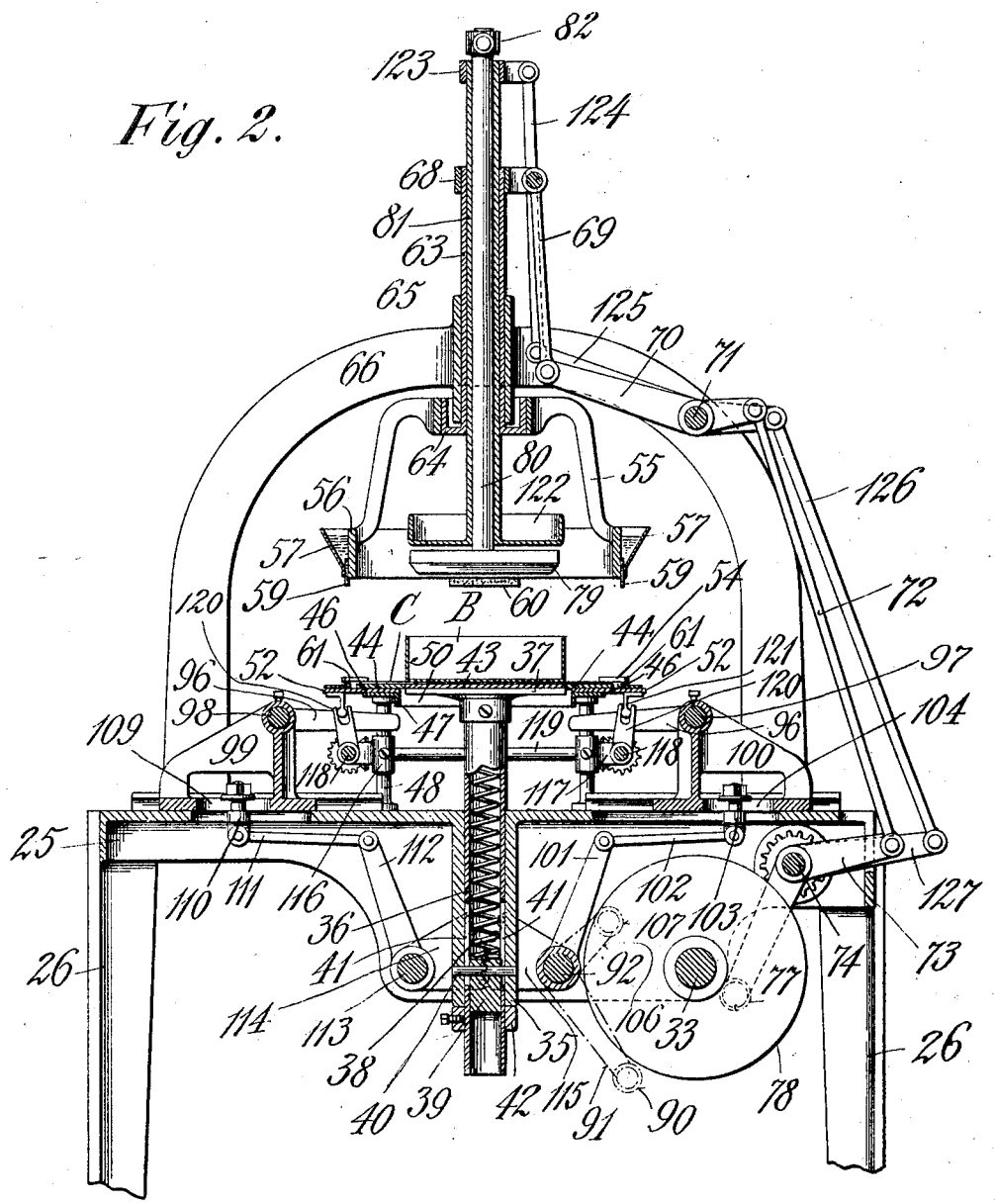
Figure 3:
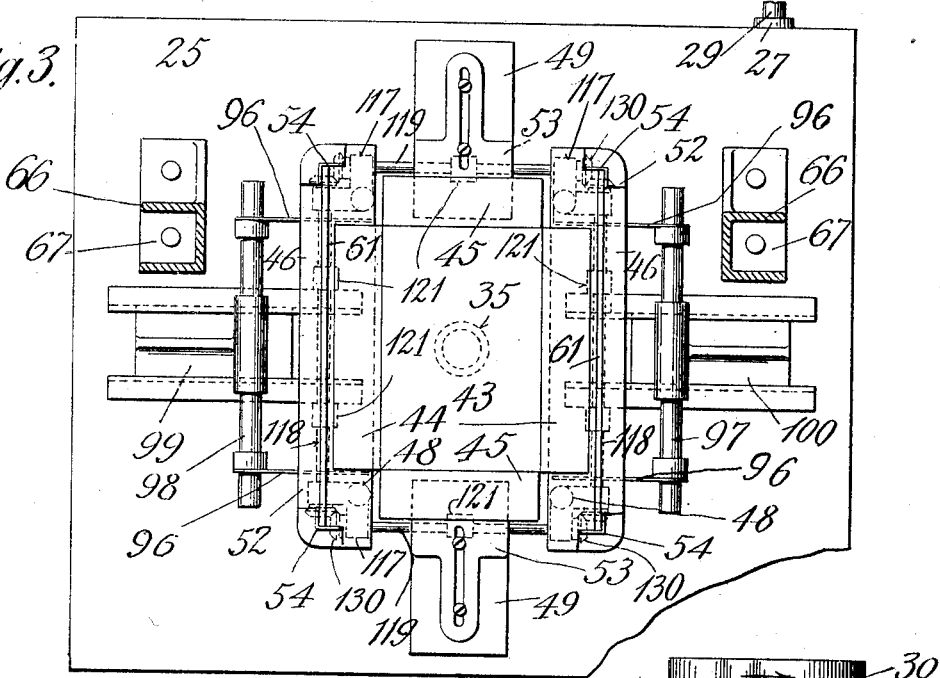
Figure 4:
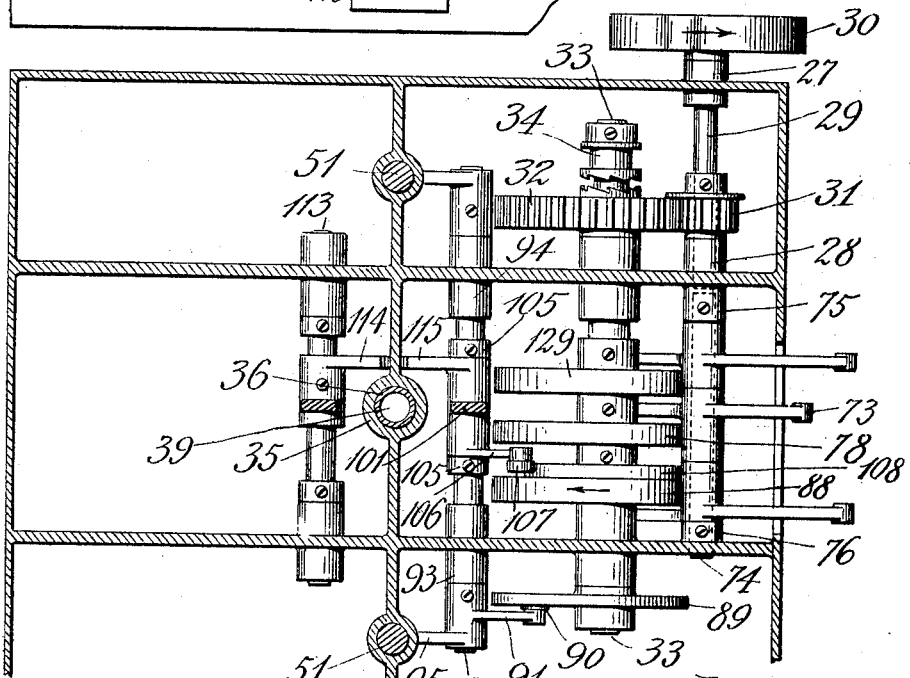
Figure 12:
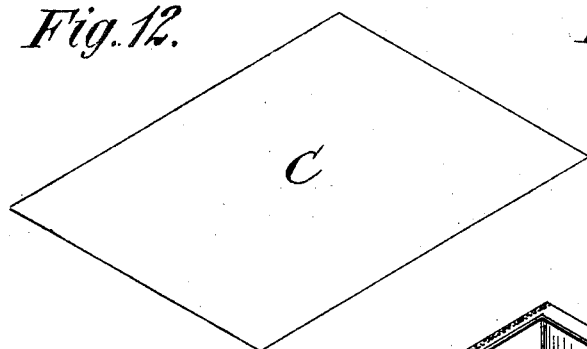
Figure 13:
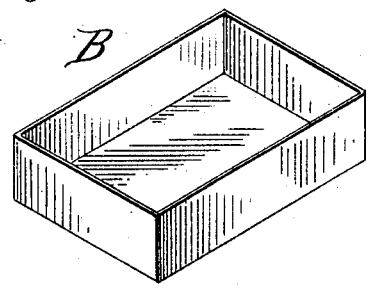
Figure 14:
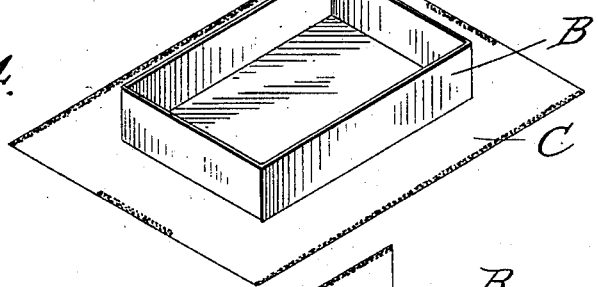
Figure 15:
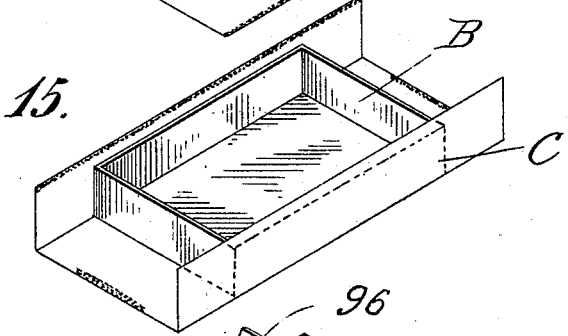
Figure 16:
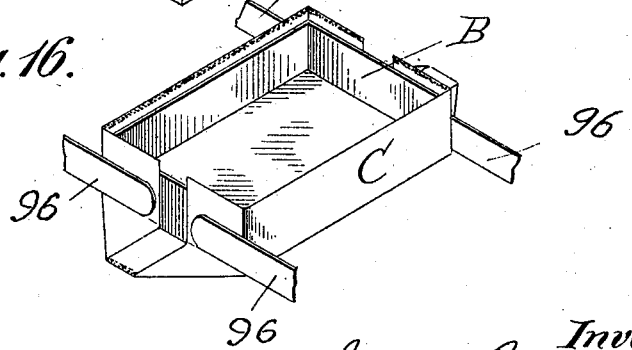

Figure 1 represents a side view of a machine built in accordance with my invention. Fig. 2 is a central vertical section thereof, taken on line 2 2 of Fig. 1. Fig. 3 is a top view of the bed-plate, the superstructure having been removed on line 3 3 of Fig. 1. Fig. 4 is a horizontal section on line 4 4 of Fig. 1 and represents a section of the bed-plate with its stop removed. Figs. 5 to 11, inclusive, show in diagrammatic form the various operations through which the machine successively passes in doing its work. Figs. 12 to 18, inclusive, are perspective views of the successive stages through which the box passes during the process of covering, namely: Fig. 12 represents the sheet with which the box shown in Fig. 13 is to be covered. Fig. 14 illustrates the manner in which the box is placed on the sheet. Fig. 15 shows the sides of the sheet turned up. Fig. 16 shows the ends tucked. Fig. 17 illustrates the tucked ends folded upward preparatory to the sheet edges being turned inward. Fig. 18 shows the box covered.

Referring to the drawings, 25 denotes the bed-plate of the machine, supported on legs 26 and having bearings 27 and 28 for supporting the main driving-shaft 29, which may carry a pulley 30, to which power may be applied from any convenient source.

Mounted upon the shaft 29 is a pinion 31, adapted for engagement with a gear 32, loosely mounted upon a cam-shaft 33, upon which the various movement-imparting devices or cams are secured and which may be caused to rotate with the gear 32—as, for instance, by a clutch member 34, splined on the shaft 33 and having teeth adapted for engagement with similar teeth carried by said gear 32, all as very common in many machines.

Disposed near the center of the bed-plate 25 is a hub or barrel 35, adapted to receive in sliding contact a tube 36, which constitutes the stem or support for a table 37, upon which the box to be covered is supported during the process of covering the same.

Means are provided for normally maintaining the table 37 in its upward or raised position, these means comprising in the present instance a spring 38, bearing with its upper end against the under side of the table 37 and with its lower end against a plug 39, fitted for sliding movement within the interior of the tube 36 and held stationary by a pin 40, seated in the hub 35 and passing through slots 41, disposed at opposite sides in the tube 36, while the upward movement of the table 37, or, more properly speaking, that of the tube 36, may be limited—as, for instance, by a collar 42, secured upon said tube below the barrel 35.

The table 37 serves, as has above been stated, as a support for the box during the process of covering the same, and inasmuch as it is essential that the covering-paper shall be brought or laid closely against the sides of the box I preferably secure on top of the table 37 dummy-sections corresponding in size and shape to the bottom and the four sides of the box to be covered and in such a manner that the bottom dummy 43 may be disposed exactly in alinement with and centrally disposed relatively to other devices, whereby the covering-paper will be wrapped around the said box, while the side dummy 44 and the end dummies 45 are in the present instance pivoted or hinged to the bottom dummy 43, so as to be free to be turned upward, as will be hereinafter described. This dummy may advantageously be composed of cardboard scored on the lines indicated in Fig. 3, so that the four flaps thereof may be swung up and down, respectively, in the successive box-covering operations.

Referring to Fig. 2, it will be seen that the table 37 is in its normal or raised position and that the side dummies 44 are in a horizontal plane with the bottom dummy 43 and are thus supported in a general way upon side tables 46, which in the preferred form thereof shown have an inward downwardly-projecting flange 47 and may be supported upon posts 48, secured upon the bed 25. In a similar manner the end tables 49 for supporting the end dummies 45 in a general way also have downwardly-projecting flanges 50 and are supported on posts 51, which in this case are mounted for vertical movement, while the aforementioned posts 48 are stationary. Specifically, the side dummies 44 and end dummies 45 rest upon slides 52 and 53, respectively, the function of which is to fold the edges of the covering-sheet which project above the upper edges of the box proper inward after the sides of the box are covered, the several horizontally-movable infolding slides being supported upon the tables 46 and 49, respectively, and in turn supporting the dummies 44 and 45, above referred to.

Means are provided for positioning the covering-sheet above the table 43, these means comprising in the present instance corner-gages 54, secured upon the side infolders 52, the covering-sheet, designated by C, (see Fig. 2,) being in position to have gum or similar material applied at its edges by a gummer device supported for vertical movement and disposed above the table 43 and comprising a spider 55, supporting a rectangular frame 56, on which the gum-supplying members are held. The gummer consists in the present instance of gum-boxes 57 and 58 for gumming the long and short ends of the covering-sheet, respectively, through the intervention of strips of felt or other absorbent material 59 and 60, so that when such strips are brought into contact with the upper surface of the covering-sheet a layer of gum will be deposited thereon, it being understood that the gum oozes down from the gum-boxes through the felt sections, which directly constitute the blank gumming fingers or members.

In order to provide a firm support for the edges of the sheet beyond the dummies while they are being gummed, I provide narrow support-strips 61, secured to the respective infolders, respectively, adjacent the corner-gages 54. (See Figs. 2 and 3.)

The mechanism for imparting a vertical reciprocatory movement to the gumming frame or spider 55 comprises a plunger 63, here shown as in the form of a sleeve, having at its lower end an enlargement 64, to which the said spider 55 is secured, and having bearing in a hub 65, formed on an arch 66, which is secured to the bed-plate 25, as at 67. The upper end of the plunger 63 carries a collar 68, connected to which is one end of a link 69, the other end of which is pivotally secured to a lever 70, fulcrumed intermediate its ends on a stud 71, which is firmly held in the arch 66, above referred to, and the other end of the lever 70 is connected through a pitman-rod 72 with an angle-lever 73, fulcrumed on a shaft 74, which is stationary and supported in bearings or hubs 75 and 76, formed on the bed-plate 25. (See Fig. 4.) The other arm of the angle-lever 73 carries a roller 77 in engagement with a cam 78, mounted upon the cam-shaft 33, above referred to.

In the present machine it is intended that a box should be placed on the table 37 by hand, and means are provided for positioning the same relatively to the bottom dummy 43, these means comprising a plunger 79, slightly smaller than the inside dimensions of the box and having a stem 80, adapted for sliding movement through a sleeve 81, which supports another plunger, to which reference will be had hereinafter.

Secured upon the stem 80 is a collar 82, pivotally supporting a link 83 (see Fig. 1) the other end of which is connected with a lever 84, also fulcrumed on the stud 71, above referred to, and connected through a pitman-rod 85 with an angle-lever 86, which is pivoted on the shaft 74, above mentioned, and carries a cam-roller 87, to be operated upon by a cam 88 on the cam-shaft 33. The particular function of this plunger 79 is twofold—namely, first, to approximately position the box relatively to the bottom dummy 43, and, second, to move the box B, with its supporting-table 37, downwardly until the upper edges of the box will arrive at a position just below the lower surface of the infolding slides 52 and 53, which movement will result in causing the long sides of the covering-sheet to be laid against the long sides of the box in a manner shown in Fig. 15, this movement taking place after the blank has been gummed in the proper manner.

Referring more especially to the diagrams Figs. 5 to 11, it will be seen that in Fig. 5 the gumming-strips 59 and 60 are depositing a layer of gum on the edges of the covering-sheet. In Fig. 6 the plunger 79 has positioned the box substantially accurately over the supporting-table 37, and at the same time the gumming-strips 59 and 60 have been slightly raised to clear the blank. The next movement of the plunger 79 will be to carry the box bodily downward to the position shown in Fig. 7, in which it is shown that the long sides of the blank sheet have been turned upward, projecting higher than the edges of the stationary side tables 46, while the end tables 49 have also descended with the table 37, thus maintaining the end dummies 45 in a horizontal condition, so that the ends of the blank will remain flat, as shown in Fig. 15. The end tables constitute supports for the blank ends while the same are being gummed and then retire downwardly to form no obstruction to the tucking operation. The vertical movement of the end tables 49 is in the present instance effected through the rotation of a cam 89, engaging a cam-roller 90, held on a lever 91, which is secured upon a shaft 92, journaled in bearings 93 and 94, secured to or forming a part of the bed-plate 25. (See Fig. 4.) Coöperative with the shaft 92 are a pair of lifter-levers 95, the free ends of which are in engagement with the posts 51, above referred to, and which support the end tables 49, with the infolders 53. After the box sides have thus been covered by the sheet, as shown in Fig. 15, the ends of the sheet are tucked in a manner shown in Fig. 16 by tuckers 96, supported on rods 97 and 98, which in turn are firmly secured in slides 99 and 100, respectively.

Referring to Fig. 2, it will be seen that the slide 100 may be directly moved inwardly by an arm 101, connected through a link 102 with a bolt 103, the stem of which passes through a slot 104 and may be secured thereon in any desired position. The arm 101 is fulcrumed between collars 105 on the shaft 92, above referred to, and may be actuated by a lever 106, carrying a roller 107 in engagement with the cam 108, which is rotatable with the shaft 33 and may be secured at the side of the cam 88, above mentioned. (See Figs. 2 and 4.) In a similar manner the slide 99 is slotted, as at 109, to receive the stem of a bolt 110, which is connected through a link 111 with an arm 112, fulcrumed or secured on a shaft 113. Both the arms 101 and 112 are caused to move simultaneously toward and away from each other by a pair of sectors 114 and 115, movable with the arms 101 and 112.

From the above it will be seen that while the amount of movement of the slides 99 and 100 is under the control of the cam 108, yet the particular position or zone of their travel may be varied by varying the position of the bolts 103 and 110 on said slides.

The tucker 96 will become effective in tucking the ends of the covering-sheet in the manner shown in Fig. 16 as soon as the box has arrived at its lower position, as shown in Fig. 8, and the end tables 49 are next raised to the position shown in Fig. 9, thus folding the tucked end flaps of the sheet over the tuckers 96, as shown in Fig. 17. Here it will be seen that the edges of the covering-sheet project above the upper edges of the box for a certain distance, and while the box is maintained in its present position the infolding slides 52 and 53 are moved toward the center of the box in the manner shown in Fig. 10 and by means as follows: Secured upon the table-posts 48 are brackets 116, each comprising a pair of bearings 117 for side shafts 118 and end shafts 119, the axes of which form a rectangle, as indicated in Fig. 3, and which are provided with bevel-gears 130 at their ends for causing all of the shafts to move simultaneously. The shafts 118 and 119 constitute rock-shafts and carry arms 120, the upper ends of which are preferably bifurcated to straddle downwardly-projecting flanges 121, secured to the under sides of the infolders, Fig. 2. Rocking movement is imparted to the shafts 118 primarily by an auxiliary movement of the slides 99 and 100 toward each other, this movement taking place after the tucked ends of the covering-sheet have been folded or turned upward through the ascent of the end tables 49, so that the upper edges of the blank are bent inward substantially at right angles to the sides of the box, (see Fig. 10,) whereupon the infolders are withdrawn to their normal position and will leave the blank edges in condition to be forced downward into the interior of the box and at the same time pressed against the sides thereof by a pressing-plunger 122, secured to the lower end of the sleeve 81, above mentioned, and being mounted for vertical movement within the plunger 63 of the gumming-spider 55. The plunger 81 carries at its upper end a collar 123, which is connected through a link 124 with a lever 125, fulcrumed intermediate its ends on the stud 71, above referred to, and having its other end connected through a pitman 126 with an angle-lever 127, the other arm of which carries a cam-roller 128 in engagement with the cam 129, secured upon the cam-shaft 33. The particular function of the plunger 122 is clearly illustrated in Fig. 11, in which the projecting edges of the blank sheet are shown turned downward and into the box and at the same time pressed against the inner sides thereof, the box sides being sustained against such internal pressure by the downwardly-projecting flanges 47 and 50 on both the side tables 46 and end tables 49, respectively. Both the plungers 122 and 79 are now raised, thus permitting the spring 38 to raise the supporting-table 37 with the completely-covered box to its normal and elevated position, thus permitting the side and end dummies to rest again on the tables, as before, ready for the reception of another box to be covered.

Of course in lieu of having carrier-slides for the tucker-blades strike the levers 120 of the rock-shafts 118 to insure the movements of all of the inturner-slides, as indicated as done in Fig. 2, actuating means not supplemental or auxiliary to the means for giving the movements to the tucker-blades might be substituted.

While considerable reference has been hereinabove made to the employment of the dummy sheet having the hinged or flexible flaps overlying the side and end table-sections, it is to be here stated that the employment of such flap-provided device made of cardboard or any semirigid material is conducive to advantageous results in the box-covering operations, such sheet, with its flaps, protecting the more or less highly finished or delicate covering-sheet from becoming soiled or marred or ruptured, as might in some cases occur by the direct contact more or less forcibly against the glazed or otherwise-surface-finished covering-paper of the metallic relatively movable parts and devices operative about the box.

I have heretofore constructed and put into successful practical operation for commercial purposes a box-covering machine in which all of the covering operations were not automatically performed, and I desire it to be understood that a machine having in its organization the central depressible table, the stationary side table-sections, the depressible end table-sections, in combination with the inturning-slides and the devices for tucking and infolding the corner portions of the sheet, amounts to a very useful and practical semiautomatic contrivance for use in a box-factory, it being feasible to gum the sheets before they are placed in the machine and after wrapping by the devices just above stated, the sheet about the box leaving the upstanding marginal portions of the sheet, as shown in Fig. 17, and to then inturn and downwardly turn the sheet edges against the inner walls of the box by hand, and, again, it is to be understood that changes of a minor or merely structural character may be made under and within the scope of this invention without departing from the same.

Having thus described my invention, what I claim, and desire to secure by Letters Patent, is—

1. In a box-covering machine, the combination with a horizontal depressible support for sustaining both a covering-sheet and a box centrally disposed within the margins of such sheet, and on such sheet, and independent supports for the marginal portions of said sheet, of means for gumming the marginal portions of the sheet outlying beyond the box on said supports therefor, and means for folding opposite portions of the sheet against the box sides.

2. In a box-covering machine, the combination with a central depressible table and outlying opposite side stationary table-sections, of depressible outlying end table-sections, a former adapted for movement downwardly against the central depressible table and away therefrom, and means for lifting, and permitting the lowering, of the end table-sections.

3. In a box-covering machine, the combination with a central depressible table and outlying opposite side stationary table-sections, of depressible outlying end table-sections, of a former movable downwardly against the central depressible table and away therefrom, reciprocatory tuckers located below the level of the stationary side table-sections, and movable across and in planes adjacent the ends of the former on the corner portions of the covering-sheet which are extended beyond the planes of the box ends, means for imparting their movements thereto, and means for lifting, and insuring the lowering of the said depressible end table-sections to a horizontal plane below the locations of said reciprocatory tuckers.

4. In a box-covering machine, the combination with a central depressible table and outlying opposite side stationary table-sections, of depressible outlying end table-sections, of a reciprocatory plunger movable downwardly against the central depressible table and away therefrom, means for lifting and permitting the lowering of the end table-sections, reciprocatory inturning devices and means for imparting their movements inwardly and outwardly in a plane parallel with the top of the central depressible table, and means for operating the plunger.

5. In a box-covering machine, the combination with a central depressible table and a supporting-spring therefor, outlying opposite side stationary table-sections and depressible outlying end table-sections, of a reciprocatory plunger movable downwardly against the central depressible table and away therefrom, means for lifting and permitting the lowering of the end table-sections, and means for imparting the reciprocatory movements to the plunger.

6. In a box-covering machine, the combination with a central depressible table and outlying opposite side stationary table-sections, depressible outlying end table-sections, vertically-guided posts on which such latter sections are supported, a cam and connections between same and said end table-sections, for elevating and lowering the same, of a reciprocatory plunger movable downwardly against the central depressible table and away therefrom, means for lifting and permitting the lowering of the end table-sections, and means for imparting the reciprocatory movements to the plunger.

7. In a box-covering machine, the combination with a central depressible table and outlying opposite side stationary table-sections, and depressible outlying end table-sections, of a reciprocatory plunger movable downwardly against the central depressible table and away therefrom, means for lifting and permitting the lowering of the end table-sections, reciprocatory tucker-blades operative on the corner portions of the covering-sheet, slides on which said tucker-blades are horizontally carried, means for reciprocating said slides horizontally, and means for imparting the reciprocatory movements to the plunger.

8. In a box-covering machine, the combination with a central depressible table and outlying opposite side stationary table-sections, and depressible outlying end table-sections, of a reciprocatory plunger movable downwardly against the central depressible table and away therefrom, means for lifting and permitting the lowering of the end table-sections, pairs of reciprocatory tucker-blades operative on the corner portions of the covering-sheet, slides on which pairs of said blades are carried, shafts 92 and 113, having meshing sectors, a cam, for imparting rocking movements to one of said shafts, connections between said shafts and the respective blade-carrying slides, and means for imparting the reciprocatory movements to the plunger.

9. In a box-covering machine, the combination with a central depressible table and outlying opposite side stationary table-sections, of depressible outlying end table-sections, of a reciprocatory plunger movable downwardly against the central depressible table and away therefrom, means for lifting and permitting the lowering of the end table-sections, reciprocatory inturning devices supported to slide on, and in the planes of, the outlying table-sections, means for imparting their movements inwardly and outwardly in pairs at right angles to each other, and means for operating the plunger.

10. In a box-covering machine, the combination with a central depressible table and outlying opposite side stationary table-sections, and depressible outlying end table-sections, of a reciprocatory plunger movable downwardly against the central depressible table and away therefrom, a reciprocatory frame carrying gummer members movable toward and away from the said side and end table-sections, means for lifting and permitting the lowering of the end table-sections, reciprocatory inturning devices and means for imparting their movements inwardly and outwardly in a plane parallel with the top of the central depressible table, and means for operating the plunger, and means for operating the gummer-carrying frame.

11. In a box-covering machine, a main supporting-bed and an elevated support, comprising a central spring-supported depressible box-supporting table, outlying and adjacent stationary side table-sections, outlying and adjacent depressible end table-sections, a plunger 79 and means for reciprocating it, vertically-guided supports for the depressible end table-sections, and means for raising and lowering them, inturning horizontally-movable slides on the stationary and depressible side and end table-sections, tuckers movable across and adjacent the ends of the central depressible table, means for imparting reciprocatory movements to the tuckers and means for imparting approaching and separating movements to the inturning-slides, for the purposes substantially as set forth.

12. In a box-covering machine, a main supporting-bed and an elevated support, comprising a central spring-supported depressible box-supporting table, outlying and adjacent stationary side table-sections, outlying and adjacent depressible end table-sections, a reciprocatory gummer movable against and away from said outlying table-sections, a plunger 79, somewhat smaller than the dimensions of the box, and means for reciprocating it, vertically-guided supports for the depressible end table-sections, and means for raising and lowering them, inturning horizontally-movable slides on the stationary and depressible side and end table-sections, tuckers movable across and adjacent the ends of the central depressible table, means for imparting reciprocatory movements to the tuckers and means for imparting approaching and separating movements to the inturning-slides, and a second reciprocatory plunger arranged with the same axis of movement as the first-named plunger, and having somewhat greater transverse dimensions than said first plunger, for the purposes substantially as set forth.

13. In a box-covering machine, the combination with outlying table-sections normally arranged in a common horizontal plane at the opposite sides of an intermediate opening, the end pair of such sections being depressible, of slides movable parallel with the length of the stationary side table-sections, and supporting horizontal rods 97 98, at locations below said normal plane of said table-sections, pairs of tucker-blades carried substantially in parallelism on end portions of said rods, means for imparting back and forth horizontal motions to said slides, and means for raising the said end table-sections to said normal plane, and lowering the same to locations below said rods and tucker-blades.

14. In a box-covering machine, the combination with stationary side table-sections and depressible end table-sections having inturning-slides mounted thereon and having approaching and separating horizontal movements and having depending members 121, of rock-shafts having lever extensions engaging said depending members, and means for imparting rocking movements to said shafts.

15. In a box-covering machine, the combination with stationary side table-sections, and depressible end table-sections having inturning-slides mounted thereon for approaching and separating horizontal movements, of rock-shafts in rectangular arrangement, and bevel-gear-connected connections between said rock-shafts and said slides, and means for imparting rotational movements to one of said gear-connected rock-shafts.

16. In a box-covering machine, the combination with the stationary side table-sections, and end table-sections mounted for rising and lowering movements, and means for imparting such movements thereto, of end inturning-slides supported on and movable across said table-sections, and having depending members, rock-shafts in rectangular arrangement, gear-connected, and having slotted radial levers with which the depending members of the inturning-slides are engaged.

17. In a box-covering machine, the combination with the main bed having the slots therein, a central depressible table and outlying opposite side table-sections, elevated above the main bed, and depressible outlying end table-sections, also normally elevated above the main bed, of a former adapted for movement downwardly against the central depressible table and away therefrom, means for lifting and permitting the lowering of the end table-sections, the slides 99 and 100 having slotted bases and carrying the substantially parallel tucking-blades, at a level between the top of the bed, and said table-sections, shouldered bolts adjustably engaged with said slides, through the slotted bases thereof, and cam-actuated connections operatively engaged with said bolts.

Signed by me at Springfield, Massachusetts, in presence of two subscribing witnesses.

JOSEPH BARDELLI.

Witnesses:
WILLIAM J. DUNN,
WM. S. BELLOWS.